United States Patent
Er et al.

(10) Patent No.: US 12,099,556 B2
(45) Date of Patent: Sep. 24, 2024

(54) WORKING CONTEXT TRANSFER ACROSS DEVELOPMENT ENVIRONMENTS

(71) Applicant: Microsoft Technology Licensing, LLC, Redmond, WA (US)

(72) Inventors: Hui Ling Er, Seattle, WA (US); Kai-Uwe Maetzel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 17/987,390

(22) Filed: Nov. 15, 2022

(65) Prior Publication Data

US 2024/0160442 A1    May 16, 2024

(51) Int. Cl.
| | |
|---|---|
| *G06F 8/60* | (2018.01) |
| *G06F 8/34* | (2018.01) |
| *G06F 8/71* | (2018.01) |
| *G06F 8/77* | (2018.01) |
| *G06F 11/36* | (2006.01) |
| *G06F 16/907* | (2019.01) |
| *G06Q 10/067* | (2023.01) |

(52) U.S. Cl.
CPC .............. *G06F 16/907* (2019.01); *G06F 8/34* (2013.01); *G06F 8/71* (2013.01); *G06F 8/77* (2013.01); *G06F 11/3664* (2013.01); *G06Q 10/067* (2013.01)

(58) Field of Classification Search
CPC .......... G06Q 10/067; G06F 8/34; G06F 8/77; G06F 8/71; G06F 16/907; G06F 11/3664; G06F 8/60
See application file for complete search history.

(56) References Cited

U.S. PATENT DOCUMENTS

2005/0203764 A1*   9/2005  Sundararajan ............ G06F 8/34
                                                                              717/105
2020/0050431 A1    2/2020  Zilouchian Moghaddam et al.
(Continued)

OTHER PUBLICATIONS

"Cannot continue edit session in remote repositories #158991", retrieved from << https://github.com/microsoft/vscode/issues/158991 >>, Aug. 23, 2022, 6 pages.
(Continued)

*Primary Examiner* — Tuan A Vu
(74) *Attorney, Agent, or Firm* — Ogilvie Law Firm

(57) ABSTRACT

Some embodiments transfer a software development working context between development environments. The environments may be on the same machine, or on different machines. The working context includes ephemeral state information (ESI), such as edits not yet committed to a repository, development tool user interface state, command history, build history, debug history, execution history, tool window content, hot exit files, or search filters, among others. The ESI is computationally gathered from RAM and other locations in a source environment, written to an edit session artifact (ESA), and then read from the ESA and installed at a target environment. The transfer is accomplished without committing source code to any source code version control system, e.g., repository. The transfer may be tailored for efficiency or efficacy by determining whether a particular software development capability is present in one or both of the environments.

20 Claims, 3 Drawing Sheets

(56) References Cited

U.S. PATENT DOCUMENTS

| | | | |
|---|---|---|---|
| 2020/0409824 A1* | 12/2020 | Balasubramanian | ........................ G06F 11/3664 |
| 2021/0319166 A1 | 10/2021 | Lyu et al. | |
| 2022/0036260 A1* | 2/2022 | Krishnan | ............. G06Q 10/067 |
| 2022/0107802 A1* | 4/2022 | Rao | ........................ G06F 16/907 |

OTHER PUBLICATIONS

"Auto-store edit sessions on window close #158409", retrieved from << https://github.com/microsoft/vscode/issues/158409 >>, Aug. 17, 2022, 3 pages.

"Explore 'Continue on' support in core", retrieved from << https://github.com/microsoft/vscode/issues/141293 >>, Jan. 24, 2022, 9 pages.

Mark W. Kaelin, "How to use the Continue on PC feature in Windows 10", retrieved from << https://www.techrepublic.com/article/how-to-use-the-continue-on-pc-feature-in-windows-10/ >>, Sep. 1, 2020, 16 pages.

Mike Gunderloy, "Edit and Continue: useful tool or disaster in waiting?", retrieved from << https://adtmag.com/articles/2004/10/21/edit-and-continue-useful-tool-or-disaster-in-waiting.aspx?m=1 >>, Oct. 21, 2004, 7 pages.

Sumukh Rao, "You can now continue watching YouTube videos from your phone on your computer", retrieved from << https://www.xda-developers.com/youtube-continue-watching-feature/ >>, Oct. 4, 2021, 5 pages.

"Virtual Workspaces", retrieved from << https://code.visualstudio.com/api/extension-guides/virtual-workspaces >>, Oct. 6, 2022, 4 pages.

"when clause contexts", retrieved from << https://code.visualstudio.com/api/references/when-clause-contexts >>, Oct. 6, 2022, 7 pages.

"Working with GitHub in VS Code", retrieved from << https://code.visualstudio.com/docs/sourcecontrol/github#_continue-working on >>, Oct. 6, 2022, 14 pages.

"VS Code Remote Development", retrieved from << https://code.visualstudio.com/docs/remote/remote-overview >>, Oct. 6, 2022, 2 pages.

"Initial implementation of Continue Edit Session #151528", retrieved from << https://github.com/microsoft/vscode/pull/151528 >>, Jun. 8, 2022, 5 pages.

"Why Should I Use File Sharing in Project Management Software?", retrieved from << https://www.wrike.com/project-management-guide/faq/why-should-i-use-file-sharing-in-project-management-software/ >>, no later than Oct. 13, 2022, 8 pages.

"About Windows backup and sync settings", retrieved from << https://support.microsoft.com/en-us/windows/about-windows-backup-and-sync-settings-deebcba2-5bc0-4e63-279a-329926955708 >>, no later than Oct. 12, 2022, 4 sheets.

"How Visual Studio makes version control easy with Git", retrieved from << https://learn.microsoft.com/en-us/visualstudio/version-control/git-with-visual-studio?view=vs-2022 >>, Sep. 1, 2022, 6 pages.

"Navigate recent locations and changes", retrieved from << https://www.jetbrains.com/help/rider/Navigation_and_Search_Navigating_to_Recent_Locations.html >>, Aug. 2, 2022, 7 pages.

"Gitpod: FAQs", retrieved from << https://www.gitpod.io/docs/references/ides-and-editors/faqs >>, no later than Oct. 30, 2022, 4 pages.

"Transferring files using a client", retrieved from << https://docs.aws.amazon.com/transfer/latest/userguide/transfer-file.html >>, no later than Oct. 30, 2022, 10 pages.

"StackBlitz", retrieved from << https://stackblitz.com/ >>, no later than Oct. 30, 2022, 16 pages.

"CodeSandbox", retrieved from << https://codesandbox.io/ >>, no later than Oct. 30, 2022, 7 pages.

"Take your changes with you when switching development environments", retrieved from << https://code.visualstudio.com/updates/v1_72#_take-your-changes-with-you-when-switching-development-environments >>, no later than Sep. 30, 2022, 40 pages.

"Bring your changes with you when moving across development environments", retrieved from << https://code.visualstudio.com/updates/v1_71#_bring-your-changes-with-you-when-moving-across-development-environments >>, no later than Aug. 31, 2022, 21 pages.

"Edit Sessions across VS Code for the Web and desktop", retrieved from << https://code.visualstudio.com/updates/v1_70#_edit-sessions-across-vs-code-for-the-web-and-desktop >>, no later than Jul. 31, 2022, 29 pages.

"Access edit sessions across VS Code for the Web and desktop", retrieved from << https://code.visualstudio.com/updates/v1_69#_access-edit-sessions-across-vs-code-for-the-web-and-desktop >>, no later than Jun. 30, 2022, 36 pages.

\* cited by examiner

ASPECTS AND EXAMPLES OF TOOLS 320

| SOUCE CODE 402 EDITOR 404 | PERFORMANCE PROFILER 406 |
|---|---|
| DEBUGGER 408 | INTEGRATED DEVELOPMENT ENVIRONMENT 410 |
| COMPILER 412 | DEVELOPER IDENTITY 414 | UNTITLED FILE 416 |

USER INTERFACE 322: FOCUS / SELECTION 418 / 420 IDENTIFICATION 422

WINDOW 424 LIST 426: ERRORS 428, WARNINGS 430, COMMANDS 432

| REPOSITORY 444: BRANCH 446, COMMIT HASH 448 | HOT EXIT FILE 434 |
|---|---|
| BROWSER 450 | WORKSPACE 452 | DESKTOP 454 |
| CODE 456 EXECUTION 470 FUNCTIONALITY 458 | ARCHITECTURE 460 |
| EDITING 462 SUGGESTION 464 GENERATOR 466 | OPERATIONS 468 |

Fig. 4

EXAMPLE WORKING CONTEXT TRANSFER METHOD 500

START
↓
ASCERTAIN 502 EPHEMERAL STATE INFORMATION (ESI) IN SOURCE ENVIRONMENT
↓
WRITE 504 ESI TO EDIT SESSION ARTIFACT (ESA); READ 506 ESI FROM ESA IN TARGET ENVIRONMENT
↓
INSTALL 508 ESI IN TARGET ENVIRONMENT
↓
FINISH

Fig. 5

WORKING CONTEXT TRANSFER ACROSS DEVELOPMENT ENVIRONMENTS

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers interact with source code editors, compilers, debuggers, profilers and various other software development tools as they develop software.

Although many advances have been made, improvements in software development technologies remain possible, and are worth pursuing.

SUMMARY

Some embodiments described herein address technical challenges related to performing development work on different machines. For example, in some scenarios a developer working on software solution makes changes on one machine and then decides to move to another machine to continue work. Closing the edit session on the first machine and committing the code to a repository is one way to transfer work between the machines, but it is not the only way, and it is not always the optimal way.

As an alternative, some embodiments described herein transfer a development effort's edit session working context between two machines in different development environments, without requiring that the changes be committed to a repository. Some embodiments ascertain ephemeral state information (ESI) of a source software development environment, write ascertained ESI to an edit session digital artifact (ESA), read ESI from the ESA, and install ESI into a target software development environment. The ascertaining, writing, reading, and installing are each performed without requiring access to a repository or another source code version control system, or even the existence of a source code version control system.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects and examples of software development tools and related items;

FIG. 5 is a flowchart illustrating steps in some working context transfer methods.

DETAILED DESCRIPTION

Overview

Figure 1:
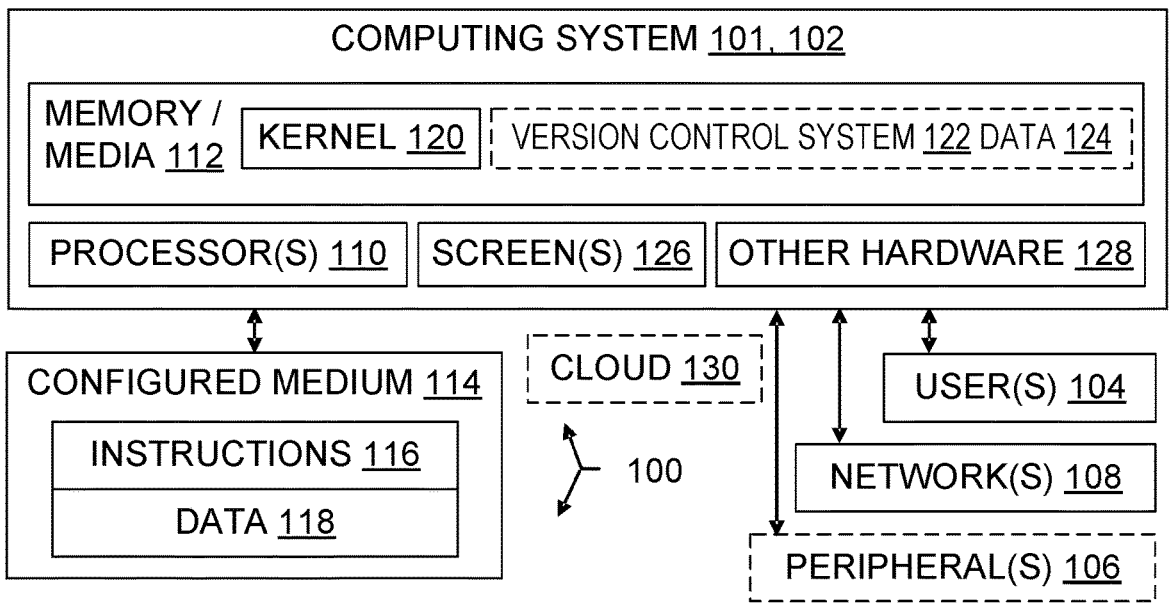
FIG. 1 is a diagram illustrating aspects of computer systems and also illustrating configured storage media, including some aspects and items which are generally suitable for systems enhanced to transfer working context between environments.

Innovations may expand beyond their origins, but understanding an innovation's origins can help one more fully appreciate the innovation. In the present case, some teachings described herein were motivated by technical challenges arising from ongoing efforts by Microsoft innovators to help software developers.

Microsoft innovators noted that a developer may want to discontinue development work on one machine and then continue that work on a different machine. One way to do this is to end the current edit session on the first machine, commit all changes to a repository, move to the second machine, download the code from the repository to the second machine, and start a new edit session on the second machine.

However, sometimes a development effort would benefit from the developer not committing the changes, or maybe not even saving the changes to disk, provided that the developer is able to go to the second machine and see there all the changes already made, and to perhaps also see the change history. For example, at a given point in the development effort the changes may be incomplete, or internally inconsistent, so committing them to the repository and thus making them more widely available is not optimal and may even be unwise. On the other hand, simply discarding the changes is also not optimal in many situations, because even though these changes are not ready for the repository they are the result of significant research, significant coding, or significant architectural or data structure design efforts. Discarding them largely wastes the effort that went into creating them.

Moreover, transferring changes between machines via a repository is not a quick, easy, or simple process. To accomplish it, a developer would check out a branch from the repository, commit the changes to the branch, push the changes to the repository, and then switch to a second machine, check out the branch on that second machine, and undo the commit on that second machine. Many developers consider this kind of transfer process a hassle not worth the effort, so they avoid it.

As a result of these circumstances, some ephemeral state information is lost when developers move between machines. Also, some work that would be done better on a different machine remains on the less optimal machine.

Accordingly, some embodiments taught herein associate changes with an editing session on a per-user basis. A user can login to another machine, open a project up, and see the changes based on the editing session and the user login. The embodiment automatically transfers the edit session state to the new machine.

A benefit provided by these embodiments is that ephemeral state information which would otherwise be lost when developers move between machines is not merely preserved, but is also installed on the second machine. This reduces repetition of development effort. For instance, an editor's user interface state such as the current cursor location in a source code file that is being edited and the current selection of text at that location and the content of the paste buffer, are automatically transferred between the two development environments.

Another benefit provided by these embodiments is that developers are more easily able to move to a machine that is optimal for the current stage of the development effort. For instance, in one scenario some initial code is written on a developer's laptop. Then the working context is transferred to a shared desktop machine which has special-purpose tools that are in high demand. Further work on the code is done on the desktop, to debug and validate the code through use of the special-purpose tools. Then the working context is transferred back to the laptop so work on it can continue while another developer uses the special-purpose tools. In the absence of the teachings herein, time would be spent on the shared desktop downloading from and uploading to a repository, thus reducing the time available to developers for utilizing the special-purpose tools.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 130. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 322 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 322 supports interaction between an embodiment and one or more human users. In some embodiments, the user interface 322 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 130 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 320 include security tools or software apps, on mobile devices 102 or workstations 102 or servers 102, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one or more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, working context transfer functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, resources, entities, or other items in a computing environment, which are disclosed herein but not associated with a particular reference numeral herein. Corresponding drawings may also be added.

More About Systems

Figure 2:
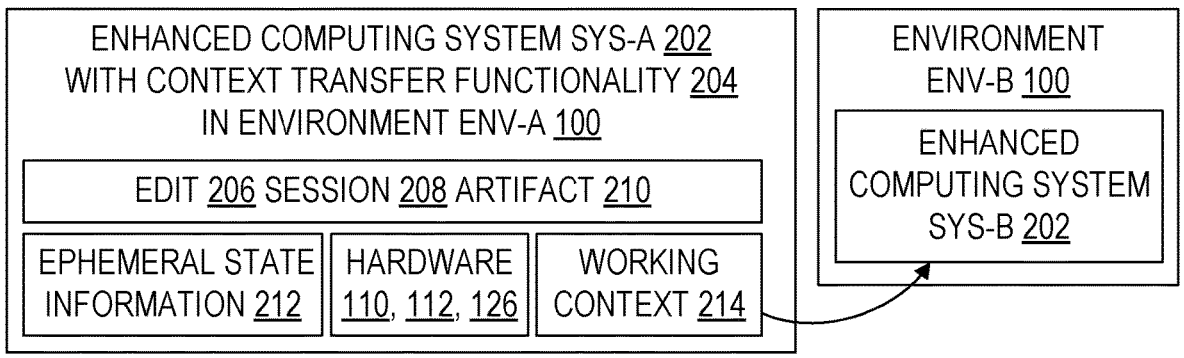
FIG. 2 is a diagram illustrating aspects of two computing environments and an enhanced system configured with working context transfer functionality.

FIG. 2 illustrates a computing system 102 configured by one or more of the working context transfer enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
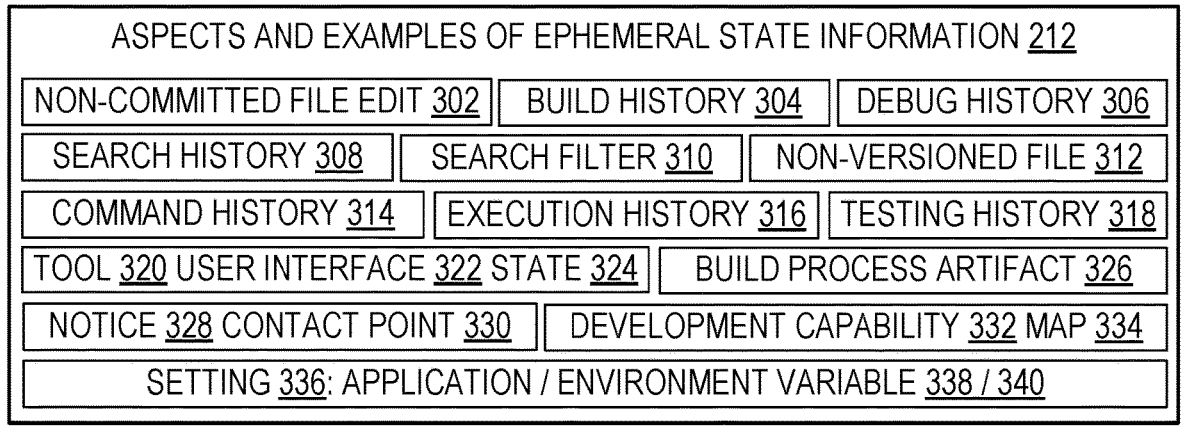
FIG. 3 is a block diagram illustrating some aspects and examples of ephemeral state information and related items.

FIG. 3 shows some aspects and examples of ephemeral state information (ESI) 212 and related items. This is not a comprehensive summary of all aspects of ESI 212 or all aspects of working context transfer functionality 204 involving two or more machines 101. Nor is it a comprehensive summary of all aspects of an environment 100 or system 202 or other context of a working context 214, or a comprehensive summary of all state transfer mechanisms for potential use in or with a system 102. FIG. 3 items are discussed at various points herein, and additional details regarding them are provided in the discussion of a List of Reference Numerals later in this disclosure document.

FIG. 4 illustrates some aspects and examples of software development tools 320 and related items. FIG. 4 items are discussed at various points herein, and additional details regarding them are provided in the discussion of a List of Reference Numerals later in this disclosure document.

In some embodiments, the enhanced system 202 is networked through an interface. In some, an interface includes hardware such as network interface cards, software such as network stacks, APIs, or sockets, combination items such as network connections, or a combination thereof.

Some embodiments capture ephemeral state information 212 from a source development environment, or retrieve ESI 212 into a target development environment, or both. Some embodiments involve one or more machines, so the development environments 100 could be both on the same machine or they could be on different machines 101. Some embodiments define ephemeral state information 212 in a way that rules out data 118 stored in a version control system 122, e.g., in a repository 444. Development tools 320 themselves and their settings 336 are also ruled out as ephemeral state information 212.

In some embodiments, a software development computing system 202, which is equipped for use in working context transfer 600 across development environments 100, includes: a digital memory 112; at least one of: a source software development environment 100, or a target software development environment 100; and a processor 110 in operable communication with the digital memory. The processor is configured to perform context transfer operations 468 which facilitate a transfer of a working context from the source software development environment to the target software development environment. The context transfer operations 468 include edit session capture operations 468 or edit session retrieve operations 468 or both. The edit session capture operations include ascertaining 502 ephemeral state information of the source software development environment and writing 504 at least a portion of the ascertained ephemeral state information to an edit session digital artifact 210. The edit session retrieve operations include reading 506 at least a portion of the ephemeral state information from the edit session digital artifact and installing 508 at least a portion of the read ephemeral state information into the target software development environment. The ephemeral state information 212 includes data 118 which satisfies at least the following constraints: the data is not stored in any version control system 122 which contains source code 402 under development in the source software development environment, and the data is not an executable code 456 or a setting 336 of a development tool which is present in the source software development environment.

In some embodiments, ephemeral state information 212 includes at least one of: a file edit 302 made by a software development tool and not committed to any version control system; a file 312 which has no version yet in any version control system; a search history 308 (e.g., searches in codebase); a search filter 310; a build history 304; a command history 314 (e.g., compile, build, . . . ); an execution history 316; a testing history 318; a debug history and debug and results 306; a software development tool user interface state 324; a build process artifact 326; or a notice contact point 330 operably linked to a version control system to receive notices 328 from the version control system.

In some circumstances, different environments 100 have different capabilities 332. Some embodiments employ a capabilities map data structure 334 to keep track of the capabilities and how they relate to particular kinds of ephemeral state information. For example, the capabilities map 334 may indicate that the target environment has general purpose code execution capability for ARM processor executables, or indicate that the source environment has a command line interface that maintains a command history 314. In some embodiments, the map 334 is specific to what's actually used in the source environment as opposed to what might have been used in source environment. The capabilities map can be implemented using one or more tables, key-value pairs, bit vectors, lists, or other data structures.

In some embodiments, the system 202 includes a capabilities map data structure 334 which represents at least one development capability of at least one of the development environments, and correlates the development capability with an ephemeral state information category.

In some embodiments, the system 202 includes a capabilities map data structure 334 which expressly indicates an absence or a presence of at least N of the following development capabilities 332 for at least one of the development environments: a particular processor 110 architecture 460; a particular code 456 execution 470 functionality 458 (e.g., general execution versus execution in a browser 450); a particular editing 462 suggestion 464 generation functionality 466; a particular integrated development environment 410; a particular software development tool 320; a particular version control system 122; or a particular commit hash 448 of a version control system. N is in the range from one to seven, depending on the embodiment.

In some embodiments, execution of the processor ascertains 502 ephemeral state information of at least one of the following software development tools 320 in the source software development environment: a source code editor 404 or other editor 404; an integrated development environment 410; a debugger 408; a performance profiler 406; or a compiler 412.

Other system embodiments are also described herein, either directly or derivable as system versions of described processes or configured media, duly informed by the extensive discussion herein of computing hardware.

Although specific working context transfer architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of working context transfer functionality 204, for example, as well as different technical features, aspects, security controls, mechanisms, rules, criteria, expressions, hierarchies, operational sequences, data structures, environment or system characteristics, or other functionality 204 teachings noted herein, and may otherwise depart from the particular illustrative examples provided.

Processes (a.k.a. Methods)

Figure 6:
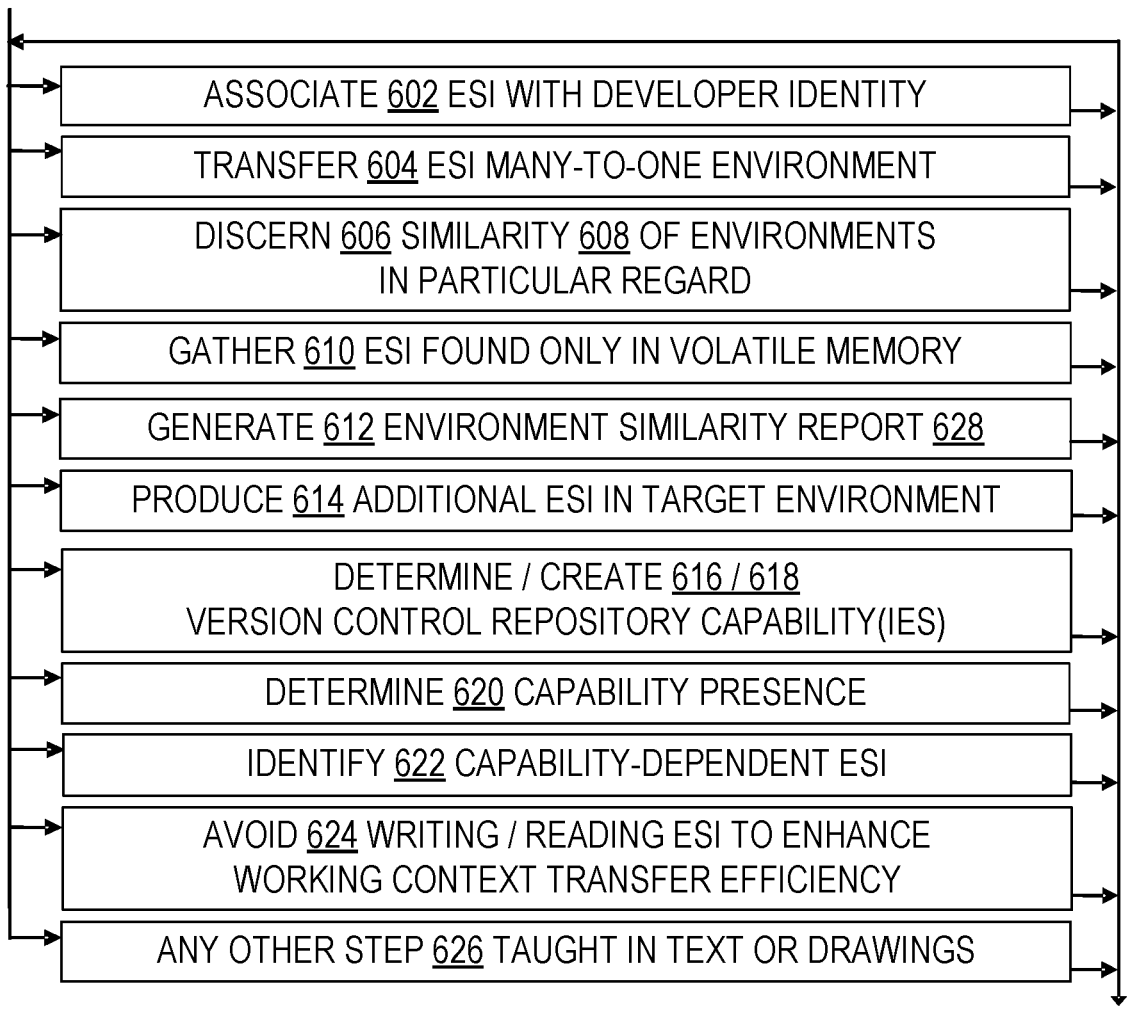
FIG. 6 is a flowchart further illustrating working context transfer methods, and incorporating FIG. 5.

Methods (which are also be referred to as "processes" in the legal sense of that word) are illustrated in various ways herein, both in text and in drawing figures. FIGS. 5 and 6 each illustrate a family of methods 500, 600 respectively, which are performed or assisted by some enhanced systems, such as some systems 202 or another functionality 204 enhanced system as taught herein. Method family 500 is a proper subset of method family 600. FIGS. 1 through 4 show working context transfer architectures with implicit or explicit actions, e.g., steps for reading, writing, or otherwise processing data 118, in which the data 118 include, e.g., ESI and ESA data, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some embodiments a human 104 types in a value for the system 202 to use as an artifact name. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 6. FIG. 6 is a supplement to the textual examples of embodiments provided herein and the textual descriptions of embodiments provided herein. In the event of any alleged inconsistency, lack of clarity, or excessive breadth due to an aspect or interpretation of FIG. 6, the text of this disclosure shall prevail over that aspect or interpretation of FIG. 6. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 6 to be non-operable, the sequence S is not within the scope of any claim. Any assertion otherwise is contrary to the present disclosure.

Some embodiments provide or utilize a working context transfer method, the method performed (executed) by a computing system 202 to facilitate a transfer of a working context from a source software development environment to a target software development environment, the method including: ascertaining 502 ephemeral state information of the source software development environment; writing 504 at least a portion of the ascertained ephemeral state information to an edit session digital artifact; reading 506 at least a portion of the ephemeral state information from the edit session digital artifact; and installing 508 at least a portion of the read ephemeral state information into the target software development environment. In some embodiments, the ascertaining, writing, reading, and installing are each performed without accessing any source code version control system.

Ephemeral state information can be personal to a developer. In some embodiments, the method includes associating 602 the ephemeral state information with a particular developer identity 414 in the computing system, e.g., in a key-value pair, table, or other data structure.

In some embodiments, writing 504 at least a portion of the ascertained ephemeral state information includes writing at least one of: an untitled file 416; a hot exit file 434; an identification 422 of a focus 418 in a software development tool user interface 322; an identification 422 of a text selection 420 in a software development tool user interface 322; content of a list of errors 428 in a window 424 in a software development tool user interface 322; content of a list of warnings 430 in a window 424 in a software development tool user interface 322; or content of a list of commands 432 in a window 424 in a software development tool user interface 322.

Some embodiments exclude particular kinds of data 118 from use as ESI 212. In some embodiments, the ascertained ephemeral state information 212 excludes each of the following: application 338 settings 336; environment variable 340 settings 336; and data 124 that is stored in a version control system 122. In some embodiments, other kinds of data are also or instead excluded from the definition of ESI 212, e.g., because such data will be otherwise transferred or because such data is not transferable due to a mismatch in the respective capabilities of the source and target environments.

In some circumstances, similarities 608 are present between the source and target environments. When multiple transfer options are available, similarities may influence a developer's or a system 202's choice of target environment, the developer's or system's choice of ESI to transfer, or both. Some embodiments include discerning 606 that the source software development environment is similar 608 to the target software development environment in at least one of the following ways: the environments are backed by the same version control system 122; the environments include non-ephemeral state information which includes source codes 402 from the same branch 446 of a repository 444; or the environments include non-ephemeral state information which includes source codes 402 having the same commit hash 448.

Some embodiments limit transfers to similar environments, e.g., environments with one or more of these following similarities 608: instances of the same IDE 410, the same repository 444, instances of the same source control 122, the same repository branch 446, the same repository commit hash 448, or a fuzzy match such as the same branch with different commit hashes.

In some circumstances, some ephemeral state information is gathered from RAM (volatile memory) and doesn't exist on disk or other nonvolatile memory. For example, a recent user interface state 324 might only be present in RAM. In some embodiments, ascertaining 502 ephemeral state information of the source software development environment includes gathering 610 from volatile memory in the computing system at least a portion of the ephemeral state information which is not stored in nonvolatile memory in the computing system. Memory scraping, core dump, garbage collection, and other technologies may be adapted to perform such gathering 610.

In some circumstances, the target environment is missing a particular capability, and in response the system 202 efficiently either does not bother to write corresponding ephemeral state information to the edit session artifact or does not bother to read corresponding ephemeral state information from the edit session artifact. For example, when transferring from a desktop 454 to a browser 450, some embodiments avoid writing newly created binary executable files 456 to the edit session artifact 210 because that code 456 will not be executable in the browser.

Some embodiments include determining 620 that a particular capability 332 which is present in the source software development environment is absent from the target software development environment; identifying 622 capability-dependent ephemeral state information which is dependent on the particular capability; and either avoiding 624 writing the capability-dependent ephemeral state information to the edit session digital artifact or avoiding 624 reading the capability-dependent ephemeral state information from the edit session digital artifact, or both.

In some situations, the target environment is missing a version control capability, and in response the embodiment automatically creates one. Some embodiments include determining 620 that a version control repository capability 332 is present in the source software development environment; determining 620 that no version control repository capability 332 is present in the target software development environment; and in response, automatically creating 618 a version control repository capability in the target software development environment.

Similarly, some embodiments include determining 620 whether a capability is present in the source software development environment; determining 620 whether the capability is present in the target software development environment; and generating 612 an environment similarity report 628 based at least in part on results of the determining steps.

In some circumstances, more than one transfer occurs. As a first particular example of multiple transfers, sometimes the developer decides to return to the previous environment. Some embodiments include producing 614 additional ephemeral state information 212 in the target software development environment; writing 504 at least a portion of the additional ephemeral state information to the edit session digital artifact or to a second edit session digital artifact or both; and installing 508 at least a portion of the additional ephemeral state information into the source software development environment (reading 506 as needed from the artifact(s) 210).

As a second particular example of multiple transfers, sometimes the developer decides to have an embodiment merge ephemeral state information from multiple environments. Some embodiments include transferring respective ephemeral state information from at least two source software development environments to the same target software development environment. For example, each source environment may have been optimal for developing respective parts of a project, and those parts will also be merged.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as edit session artifact data structures 210, software which performs a method 500 or a method 600, and ESI 212, in the form of data 118 and instructions 116, read from a removable storage medium 114 and/or another source such as a network connection, to form a configured storage medium. The configured storage medium 112 is capable of causing a computer system 202 to perform technical process steps for working context transfer, as disclosed herein. The Figures thus help illustrate configured storage media embodiments and process (a.k.a. method) embodiments, as well as system and process embodiments. In particular, any of the process steps illustrated in FIG. 5 or 6 or otherwise taught herein may be used to help configure a storage medium to form a configured storage medium embodiment.

Some embodiments use or provide a computer-readable storage device 112, 114 configured with data 118 and instructions 116 which upon execution by a processor 110 cause a computing system to perform a software development method for working context transfer across development environments, the method performed by a computing system 202 in a cloud computing environment 130, 100 or in another computing environment 100, or both. This method includes ascertaining 502 ephemeral state information of a source software development environment; writing 504 at least a portion of the ascertained ephemeral state information to an edit session digital artifact; reading 506 at least a portion of the ephemeral state information from the edit session digital artifact; and installing 508 at least a portion of the read ephemeral state information into a target software development environment. The ascertaining, writing, reading, and installing are each performed without accessing any source code version control system.

In some embodiments, the source software development environment is in a browser 450 workspace 452 and the target software development environment is in a desktop 454 remote workspace 452.

In some embodiments, writing at least a portion of the ascertained ephemeral state information includes writing at least one of: an untitled file, or a hot exit file.

In some embodiments, writing at least a portion of the ascertained ephemeral state information includes writing at least one of: an identification 422 of a focus 418 in a software development tool user interface, or an identification 422 of a text selection 420 in a software development tool user interface.

Additional Observations

Additional support for the discussion of working context transfer functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide a seamless working context transfer across development environments. A user working on a source control-backed repository inside an IDE 410 can transfer local workspace context across different development environments. A user can view a list of supported development environments. Development environment targets are provided in some embodiments by IDE extensions, and contextually displayed based on whether the current development context can be recreated in a new context by the contributing extension.

In some embodiments, when the user selects a target development environment, the user's edit session and other working context 214, such as local working changes which have not yet been committed and pushed to source control, are automatically transferred to the selected destination development environment. This eliminates the need to recreate the working context, e.g., by copying and pasting or by repeating interactions in development tools. The user's working changes are automatically uploaded to a server, downloaded in the target development environment, and applied 508 to the user's newly created development environment.

In some embodiments, these working changes are applied only to related development environments. This is achieved by way of an edit session identifier which represents metadata about how the edit session was generated. This metadata is matched to the destination workspace identifier metadata in order to install context.

With some embodiments, users can use this feature to automatically preserve their working context when working across, e.g., a repository in an IDE or in tool for the web, a repository in a codespace provided by a repository, a clone of a repository in a development container, e.g., through a remote-containers extension, or a local clone of a repository.

In some embodiments, the automatic transfer of the edit session artifact 210 based on contextual metadata is distinct from any transfer of global application-level state such as user settings, key bindings, and extensions across different instances of an IDE 410. Settings synchronization applies to global state, while edit sessions are neither application-specific nor workspace-specific data. Some embodiments, instead use contextual metadata to infer that two workspaces with potentially different uniform resource identifiers (URIs) on the filesystems they live on are ultimately related, such that an edit session generated in one workspace can be associated with another workspace for transfer.

Some embodiments perform one or more of the following transfers: transfer between a web browser virtual workspace and a desktop virtual workspace (either or both workspaces optionally backed by a respective repository), transfer between the web browser virtual workspace and a desktop local workspace (optionally backed by a repository clone), transfer between the desktop virtual workspace and the desktop local workspace, transfer between the desktop virtual workspace and a desktop remote workspace, transfer between the web browser virtual workspace and a web browser remote workspace, transfer between the web browser remote workspace and the desktop virtual workspace, transfer between the web browser remote workspace and the desktop local workspace, or transfer between the web browser remote workspace and the desktop remote workspace.

In some desktop remote workspaces, an IDE 410 user interface runs on the local machine, and an IDE server and workspace files live on a remote machine. In some desktop local workspaces, both the IDE 410 user interface and the workspace files live on the same, local machine. In some desktop virtual workspaces, the IDE 410 user interface runs on the local machine and there is no IDE server because the filesystem in question lives entirely in memory.

In some situations, a repositories IDE extension exposes a Continue On entrypoint, e.g., via a package.json schema. This allows extensions to register ways to continue working with a virtual workspace, such as workspaces provided by the repositories extension, in a different environment.

Some embodiments reconcile file paths, e.g., if the source file contents are coming from a different filesystem provider than the destination where they are being applied. Some embodiments define a workspace identifier which can be used to lookup and retrieve an edit session, e.g. a universally unique identifier (UUID)→json blob, a remote repository origin. Some embodiments implement a mechanism for an IDE extension to provide edit session context to core IDE functionality. Some embodiments implement a reduced or minimal storage service. Some embodiments implement a mechanism for storing and fetching edit session context in core IDE functionality, e.g., an explicit gesture like a command to trigger a POST, and another command to trigger a GET. Some embodiments implement a mechanism for applying edit session context in core IDE functionality, in order to reduce or avoid extension involvement.

Some embodiments pass the edit session ID as a query parameter. Some handle the edit session ID in a workbench (desktop) or an embedder (web). Some make the UI readonly while an edit session is being applied. Some surface a "continue edit session" and "list edit sessions" functionality in the UI. Some adopt the contribution point across extensions. Some permit transfer even when workspaces have an inconsistent state, e.g., by being several refs behind. The inconsistency is either resolved prior to writing the artifact 210, or marked in the artifact for handling in the target environment.

Technical Character

The technical character of embodiments described herein will be apparent to one of ordinary skill in the art, and will also be apparent in several ways to a wide range of attentive readers. Some embodiments address technical activities such as gathering 610 ESI data 212 found in volatile memory, identifying 422 and capturing 468 user interface state data 324, transferring edit session digital artifacts 210 from one workspace 452 to another, an installing ESI 212 in a target environment 100, which are each an activity deeply rooted in computing technology. Some of the technical mechanisms discussed include, e.g., context transfer software 204, edit session digital artifacts 210, virtual workspaces 452, and software development tools 320. Some of the technical effects discussed include, e.g., preserving and transferring ephemeral state information 212, and optimizing use of special-purpose tools 320. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce or avoid repeated developer-tool 320 interaction to recreate tool state and other ESI when moving a development effort between machines 101, and how to avoid duplication of data transfers, e.g., by excluding settings 336 from a working context 214. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Working context transfer operations such as writing 504 and reading an edit session artifact 210, and many other operations discussed herein, are understood to be inherently digital. A human mind cannot interface directly with a CPU or other processor, or with RAM or other digital storage, to read and write the necessary data to perform the working context transfer steps 600 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as ascertaining, associating, creating, determining, discerning, gathering, generating, identifying, installing, producing, reading, transferring, writing (and ascertains, ascertained, associates, associated, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102; data structures, values, mappings, software, artifacts, histories, ESI, and other examples are discussed herein
- 120 kernel(s), e.g., operating system(s), BIOS, UEFI, device drivers
- 122 repository or other source code version control system
- 124 data stored in a version control system, e.g., source code, tracking data, versioning data, versions of any data artifact or data resource used to build or otherwise develop software
- 126 display screens, also referred to as "displays"
- 128 computing hardware not otherwise associated with a reference number 106, 108, 110, 112, 114
- 130 cloud, also referred to as cloud environment or cloud computing environment
- 202 enhanced computing system, i.e., system 102 enhanced with working context transfer functionality 204
- 204 functionality for working context transfer as taught herein; e.g., software or specialized hardware which performs or is configured to perform steps 502 and 504, or steps 504 and 506, or steps 508 and 508, or any software or hardware which performs or is configured to perform a method 600 or a computational working context transfer activity first disclosed herein
- 206 computational activity of editing or a result thereof, in a system 102
- 208 edit session, sequence of edits 206, as represented in some system 102 (not necessarily the system 102 in which the edits occurred)
- 210 edit session artifact, an edit session or portion of an edit session that contains ESI 212
- 212 ephemeral state information
- 214 working context, a data structure containing ESI (e.g., an artifact 210), optionally supplemented with metadata 334 about one or more environment capabilities or developer identity 414 data
- 302 non-committed edit, i.e., an edit 206 not yet committed into a version control system 122
- 304 build history data, e.g., data representing software build commands and their results in a system 102
- 306 debug history data, e.g., data representing software debug commands and their results in a system 102
- 308 search history data, e.g., data representing search commands and their results in a system 102
- 310 search filter data, e.g., data representing search command parameters in a system 102
- 312 non-versioned file, i.e., a source code or other file not yet committed into a version control system 122
- 314 command history data, e.g., data representing commands and their results in a system 102
- 316 execution history data, e.g., data representing code 456 execution and its results in a system 102
- 318 testing history data, e.g., data representing code 456 testing and its results in a system 102
- 320 software development tool in a system 102, e.g., version control system, diagnostic software, browser, compiler, debugger, IDE 410, profiler; services are an example of tools
- 322 user interface; hardware and software
- 324 user interface state or tool state, or both; digital (meaning not mental)
- 326 software build process artifact, e.g., executable code, error report
- 328 notice, e.g., message, interrupt, signal; digital
- 330 contact point in a network or system 102; digital
- 332 software development capability of an environment 100
- 334 map, table, or other data structure representing capabilities 332 of at least one specific environment 100
- 336 setting, preference, default value in an application, tool, or environment
- 338 software application; tools 320 are examples
- 340 environment variable, e.g., search path, user home directory location, temporary files storage location; digital
- 402 source code; digital
- 404 source code editor, an example of a tool 320
- 406 software performance profiler, an example of a tool 320
- 408 software debugger, an example of a tool 320
- 410 integrated development environment, an example of a tool 320 which itself includes two or more integrated tools
- 412 compiler, an example of a tool 320; for present purposes, interpreters are a kind of compiler
- 414 developer identity, e.g., user name, user ID number; digital
- 416 untitled (by user) file, e.g., a temporary file which is automatically delete upon normal exit from an application
- 418 user interface focus, e.g., location of text insertion cursor, which of several windows will receive the next input; digital
- 420 user interface selection, e.g., which block of text is highlighted in response to user selection input such as double-click or hold-and-drag
- 422 data representing user interface focus or user interface selection or both
- 424 window in a user interface
- 426 list of data 118; human-readable unless specified otherwise 428 error from parsing, compilation attempt, or other computational activity by a software development tool 430 warning from parsing, compilation attempt, or other computational activity by a software development tool; in many environments, warning are less severe than errors, but other environments do not make that distinction 432 command, e.g., as entered in a shell or a tool interface 434 hot exit file, e.g., file created when a tool exits (crashes) due to a fatal error; may contain state data to help restore the tool state, at least partially, when the tool is restarted 444 repository, e.g., GitHub® repository, mark of GitHub, Inc., or another remotely accessible software version control system 446 repository versioning tree branch; digital 448 repository versioning hash; digital 450 browser, an example of a tool 320 and also an example of an environment 100

452 workspace, e.g., directory or portion of a filesystem containing files of interest for a given project or other software development effort 454 desktop, an example of a machine 101 and also an example of an environment 100

456 executable (or interpretable) code; digital 458 functionality of code 456, as evident in a system 102

460 processor architecture, e.g., which instruction set the processor 110 runs 462 source code editing 464 editing suggestion generated by an artificial intelligence mechanism; digital 466 artificial intelligence mechanism configured to generate suggestions 464

468 ESI-related operations; computational 470 execution of software, i.e., computational activity 500 flowchart; 500 also refers to working context transfer methods that are illustrated by or consistent with the FIG. 5 flowchart 502 computationally ascertain ESI 212, e.g., by gathering build history or command history from shell or IDE, gathering search history from shell or browser or IDE, gathering files 312 and 416 from filesystem, gather UI state 324 from tool 320, gathering contact point from repository, and so on; may be tailored to particular kind of source environment or even to a particular source environment, e.g., debug history is not gathered by ascertainment when no debugger is installed; "computationally" means performed in a computing system, as opposed to mentally or on paper 504 computationally write ESI to an ESA; a given ESA 210 may be in a working context data structure 214 or serve as a working context data structure 214

506 computationally read ESI from an ESA 508 computationally install ESI in an environment; where ascertaining 502 reads ESI, installing 508 writes ESI 600 flowchart; 600 also refers to working context transfer methods that are illustrated by or consistent with the FIG. 6 flowchart (which incorporates the FIG. 5 flowchart)

602 computationally associate ESI with a developer identity, e.g., in a data structure 604 computationally transfer ESI in a many-to-one environments manner, e.g., from an environment A to an environment C and also from an environment B to the environment C; may involve certain ESI from A and other ESI from B, or may involve overwriting some of the A ESI in C with B ESI, or may involve appending A ESI to B ESI in C, for example 606 computationally discern a similarity 608, e.g., based on a map 334 or on inspection of one or more environments to see what is installed there 608 computationally discernable similarity 610 computationally gather ESI from volatile memory when a copy of that ESI is not stored in nonvolatile memory 612 computationally generate a similarity report, e.g., based on a map 334 or on inspection of one or more environments to see what is installed there 614 computationally produce ESI in an environment, e.g., by operation of a tool 320

616 computationally determine whether a version control system is installed in or otherwise in use at an environment, and if one is may also determine what kind (e.g., repository or other) and which vendor 618 computationally create availability of a version control system in an environment, e.g., by installing one or creating a connection to a remote one 620 computationally determine whether a capability 332 is present in an environment 622 computationally identify ESI which depends on one or more particular capabilities 332 being present in an environment, e.g., debugger UI state 324 is dependent on debug capability 332, repository contact point 330 is dependent on repository access capability 332

624 computationally avoid a specified action, e.g., by the absence of software to execute that action or by all executed control flows going around (not executing) such software due to the value of a conditional variable 626 any step or item discussed in the present disclosure that has not been assigned some other reference numeral; 626 may thus be shown expressly as a reference numeral for various steps or items or both, and may be added as a reference numeral (in the current disclosure or any subsequent patent application which claims priority to the current disclosure) for various steps or items or both without thereby adding new matter 628 environment similarity report; digital

CONCLUSION

Some embodiments transfer a software development working context 214 between development environments 100. The environments may be on the same machine 101, or on different machines 101. The working context includes ephemeral state information (ESI) 212, such as edits 206 not yet committed to a repository 444, development tool user interface state 324, command history 314, build history 304, debug history 306, execution history 316, tool window content 426, hot exit files 434, or search filters 310, among others. The ESI 212 is computationally gathered 502 from RAM 112 and other locations 112 in a source environment, written 504 to an edit session artifact (ESA) 210, and then read 506 from the ESA and installed 508 at a target environment 100. The transfer 600 is accomplished without committing source code 402 to any source code version control system 122, e.g., repository 444. The transfer 600 may be tailored for efficiency or efficacy by determining 620 whether a particular software development capability 332 is present in one or both of the environments.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development computing system which is equipped for use in working context transfer across development environments, the computing system comprising:
    a digital memory;
    at least one of: a source software development environment which includes a software development tool having a graphical user interface, or a target software development environment, software development being development of a software program and software development comprising at least one of: compiling source code of the software program, debugging executable code of the software program, editing source code of the software program, or profiling execution performance of the software program; and
    a processor in operable communication with the digital memory, the processor configured to perform context transfer operations which facilitate a transfer of ephemeral state information of a working context from the source software development environment to the target software development environment, the context transfer operations including edit session capture operations or edit session retrieve operations or both, the edit session capture operations comprising ascertaining ephemeral state information of the source software development environment and writing at least a portion of the ascertained ephemeral state information to an edit session digital artifact, the edit session retrieve operations comprising reading at least a portion of the ephemeral state information from the edit session digital artifact and installing at least a portion of the read ephemeral state information into the target software development environment, the installed ephemeral state information excluding each of: the software development tool, data which is not generated by the software development, and data manually entered during an edit session of the software development by a user via the graphical user interface unless the data is installed together with corresponding software development tool state information which was generated by the software development tool during the software development edit session; and
    wherein the ephemeral state information comprises data which satisfies at least the following constraints: the data is not stored in any version control system which contains source code under development in the source software development environment, and the data is not an executable code or a setting of a development tool which is present in the source software development environment.

2. The computing system of claim 1, wherein the ephemeral state information includes at least one of:
    a file edit made by a software development tool and not committed to any version control system;
    a file which has no version yet in any version control system;
    a search history;
    a search filter;
    a build history;
    a command history;
    an execution history;
    a testing history;
    a debug history;
    a software development tool user interface state;
    a build process artifact; or
    a notice contact point operably linked to a version control system to receive notices from the version control system.

3. The computing system of claim 1, further comprising a capabilities map data structure which represents at least one development capability of at least one of the development environments and correlates the development capability with an ephemeral state information category.

4. The computing system of claim 1, further comprising a capabilities map data structure which expressly indicates an absence or a presence of at least three of the following development capabilities for at least one of the development environments:
    a particular processor architecture;
    a particular code execution functionality;
    a particular editing suggestion generation functionality;
    a particular integrated development environment;
    a particular software development tool;
    a particular version control system; or
    a particular commit hash of a version control system.

5. The computing system of claim 1, wherein execution of the processor ascertains ephemeral state information of at least one of the following software development tools in the source software development environment:
    a source code editor or other editor;
    an integrated development environment;
    a debugger;
    a performance profiler; or
    a compiler.

6. A working context transfer method, the method performed by a computing system to facilitate a transfer of a working context of a software development tool from a source software development environment to a target software development environment, the method comprising:
    ascertaining working context ephemeral state information of the source software development environment, the ephemeral state information comprising state information of the software development tool, the ephemeral state information created by or during at least one of: compiling source code of a software program, debugging executable code of the software program, editing source code of the software program, or profiling execution performance of the software program;

writing at least a portion of the ascertained ephemeral state information of the source software development environment to an edit session digital artifact;

reading at least a portion of the ephemeral state information from the edit session digital artifact;

installing at least a portion of the read ephemeral state information into the target software development environment, the installed ephemeral state information excluding each of: the software development tool, data which is not generated by the software development tool, and data manually entered during an edit session of the software development tool by a user via a graphical user interface of the software development tool unless the data is installed together with corresponding software development tool state information which was generated by the software development tool during the software development edit session; and wherein the ascertaining, writing, reading, and installing are each performed without accessing any source code version control system data which is not notice contact point data.

7. The method of claim 6, further comprising associating the ephemeral state information with a particular developer identity in the computing system.

8. The method of claim 6, wherein writing at least a portion of the ascertained ephemeral state information comprises writing at least one of:
an untitled file;
a hot exit file;
an identification of a focus in a software development tool user interface;
an identification of a text selection in a software development tool user interface;
content of a list of errors in a window in a software development tool user interface;
content of a list of warnings in a window in a software development tool user interface; or
content of a list of commands in a window in a software development tool user interface.

9. The method of claim 6, wherein the ascertained ephemeral state information excludes each of the following:
application settings;
environment variable settings; and
data stored in a version control system.

10. The method of claim 6, further comprising discerning that the source software development environment is similar to the target software development environment in at least one of the following ways:
the environments are backed by the same version control system;
the environments include non-ephemeral state information which includes source codes from the same branch of a repository; or
the environments include non-ephemeral state information which includes source codes having the same commit hash.

11. The method of claim 6, wherein ascertaining ephemeral state information of the source software development environment comprises gathering from volatile memory in the computing system at least a portion of the ephemeral state information which is not stored in nonvolatile memory in the computing system.

12. The method of claim 6, further comprising:
determining that a particular capability which is present in the source software development environment is absent from the target software development environment;

identifying capability-dependent ephemeral state information which is dependent on the particular capability; and either avoiding writing the capability-dependent ephemeral state information to the edit session digital artifact or avoiding reading the capability-dependent ephemeral state information from the edit session digital artifact, or both.

13. The method of claim 6, further comprising:
determining that a version control repository capability is present in the source software development environment;
determining that no version control repository capability is present in the target software development environment; and
in response, automatically creating a version control repository capability in the target software development environment.

14. The method of claim 6, further comprising:
determining whether a capability is present in the source software development environment;
determining whether the capability is present in the target software development environment; and
generating an environment similarity report based at least in part on results of the determining steps.

15. The method of claim 6, further comprising:
producing additional ephemeral state information in the target software development environment;
writing at least a portion of the additional ephemeral state information to the edit session digital artifact or to a second edit session digital artifact or both; and
installing at least a portion of the additional ephemeral state information into the source software development environment.

16. The method of claim 6, further comprising respective ephemeral state information from at least two software development environments.

17. The computer-readable storage device of claim 16, wherein the source software development environment is in a browser workspace and the target software development environment is in a desktop remote workspace.

18. The computer-readable storage device of claim 16, wherein writing at least a portion of the ascertained ephemeral state information comprises writing at least one of:
an untitled file; or
a hot exit file.

19. The computer-readable storage device of claim 16, wherein writing at least a portion of the ascertained ephemeral state information comprises writing at least one of:
an identification of a focus in a software development tool user interface; or
an identification of a text selection in a software development tool user interface.

20. A computer-readable storage device configured with data and instructions which upon execution by a processor cause a computing system to perform a software development method for transferring working context of a software development tool across development environments, the method performed by a computing system, the method comprising:
ascertaining working context ephemeral state information of a source software development environment, the ephemeral state information comprising state information of the software development tool, the ephemeral state information created by or during at least one of: compiling source code of a software program, debugging executable code of the software program, editing source code of the software program, or profiling execution performance of the software program;

writing at least a portion of the ascertained ephemeral state information of the source software development environment to an edit session digital artifact;

reading at least a portion of the ephemeral state information from the edit session digital artifact;

installing at least a portion of the read ephemeral state information into a target software development environment, the installed ephemeral state information excluding each of: the software development tool, data which is not generated by the software development tool, and data manually entered during an edit session of the software development tool by a user via a graphical user interface of the software development tool unless the data is installed together with corresponding software development tool state information which was generated by the software development tool during the software development edit session; and wherein the ascertaining, writing, reading, and installing are each performed without accessing any source code version control system data which is not notice contact point data.

* * * * *